US005537268A

United States Patent [19]
Felde et al.

[11] Patent Number: 5,537,268
[45] Date of Patent: Jul. 16, 1996

[54] MULTI-FUNCTION LOCKING MECHANISM FOR A MULTI-CELLED DATA CASSETTE MAGAZINE

[75] Inventors: Steven L. Felde; Kenneth R. Shelley, both of Tucson, Ariz.

[73] Assignee: International Business Machine Corporation, Armonk, N.Y.

[21] Appl. No.: 338,838

[22] Filed: Nov. 14, 1994

[51] Int. Cl.⁶ .................................................. G11B 15/68
[52] U.S. Cl. ............................... 360/92; 369/36; 414/331
[58] Field of Search ........................ 360/92, 91; 369/36, 369/34, 35; 414/331, 268, 277, 280

[56] References Cited

U.S. PATENT DOCUMENTS

| | | | |
|---|---|---|---|
| 3,561,004 | 2/1971 | Kozu et al. | 206/1 |
| 4,850,485 | 7/1989 | Ishikawa | 206/387 |
| 4,929,861 | 5/1990 | Metcalf | 312/18 |
| 4,958,976 | 9/1990 | Haueter | 414/331 |
| 5,004,393 | 4/1991 | Lunka et al. | 414/331 |
| 5,021,902 | 6/1991 | Ishikawa et al. | 360/92 |
| 5,153,862 | 10/1992 | Taylor et al. | 360/92 |
| 5,247,406 | 9/1993 | Apple et al. | 360/92 |
| 5,264,974 | 11/1993 | Campbell et al. | 360/92 |

FOREIGN PATENT DOCUMENTS 0392620  10/1990  European Pat. Off. ................. 360/92

63-61482  3/1988  Japan.

Primary Examiner—Stuart S. Levy
Assistant Examiner—Kevin M. Watkins
Attorney, Agent, or Firm—D. A. Shifrin; F. E. Anderson

[57]  ABSTRACT

A pass-thru cassette magazine performs several functions beyond vertically holding a plurality of data cassettes in a position randomly accessible to a data storage subsystem picker assembly, including locking the data cassettes within corresponding storage cells in either an import or export position when the magazine is not interfaced to the storage subsystem (that is during handling by an operator). The "locked" position indicates that a data cassette cannot be removed from the magazine without a force of approximately one kilogram or greater. When a magazine is interfaced to the storage subsystem, the magazine is interlocked thereto such that the magazine cannot be removed without releasing the interlock. While the magazine is interlocked, the lock on the data cassettes is disabled so that the data cassettes can be freely picked by the picker assembly or removed or inserted by an operator. If a data cassette is in a position other than import or export, a potential problem exists and the interlock mechanism release is disabled thus requiring all data cassettes to be properly positioned before the magazine could be removed from the storage subsystem.

15 Claims, 9 Drawing Sheets

MULTI-FUNCTION LOCKING MECHANISM FOR A MULTI-CELLED DATA CASSETTE MAGAZINE

FIELD OF THE INVENTION

The present invention relates generally to data handling systems, and more particularly, to a storage subsystem having a cassette magazine for providing locked and released positions for cassettes stored therein and further providing lockable and releasable positions of the magazine relative to the storage subsystem.

BACKGROUND OF THE INVENTION

Business, science and entertainment applications depend upon computers to process and record data, often with large volumes of the data being stored or transferred to removable media. The removable media typically take the form of a magnetic tape cartridge, an optical disk cartridge, floppy diskettes, or floptical diskettes. The advantages of storing data on removable media are numerous, including: a capability of storing hundreds of megabytes or even gigabytes of data (additional cartridges can be used to store still more data); providing a vehicle for long term storage and archival; backing up that data which resides on non-removable media; and providing a convenient vehicle for transferring data between computers. Typically, removable media is the most economical means of storing or archiving the data.

In the past, when a request for a specific removable data cassette (or tape reel) was issued, an operator needed to retrieve the data cassette and physically load that cassette into the storage device. This manual mode suffered a significant delay while the cassette was being retrieved by the operator before the data on that cassette could be processed. Unfortunately, the operator could easily make an error retrieving and loading an incorrect cassette.

With advancements in data storage products, the data cassettes were reduced in size while increasing an amount of data storage capability and robots were designed and incorporated to automatically retrieve cassettes and load those cassettes into a storage device. The robot is housed within an automated storage library that also contained one or more storage devices and a plurality of cassettes placed within storage cells. Still more convenience was provided by using removable magazines, each having a plurality of storage cells for loading and unloading many data cassettes at a time. The robot replaced the operator and improvements were seen in access time and in reliability. However, because the robot is a complex machine requiring multiple degrees of freedom (rotation and translation about the mechanical joints) it would require maintenance and adjustments. The robot's complexity also resulted in a significant increase in manufacturing and maintenance costs.

The difficulties that exist with the multiple degrees of freedom within a robot have been addressed, to some degree, by using a pass-through picker. The pass-through picker is the assembly that retrieves a cassette from a storage cell and places the cassette into the storage device. The pass-through picker assembly is positioned within an automated storage subsystem between the storage device and the storage cells. The storage cells are typically located parallel to and opposite the storage device(s). The pass-through picker retrieves a cassette from the storage cell, passes the cassette through its structure, and transfers the cassette to the storage device. This reduces the complexity of the picker as compared to a robot, and the pass-through picker space efficiency is improved by locating the storage cells opposite the storage device(s). As data storage products further progress, this limitation does not allow for the total number of storage cells to be maximized within the automated storage subsystem. Additionally, there is an ever increasing need to provide still greater amounts of storage capabilities in smaller spaces. Therefore, the pass-through picker in combination with the storage devices and storage cells should use space very efficiently.

Accomplishing increased storage capabilities in smaller spaces is enabled in part by improving magazine design. For instance, a magazine that minimizes its own area increases the amount of space available for cartridges and hence increases data capabilities. A storage subsystem using a pass-thru picker is further improved by using a pass-thru magazine which allows an operator to view cassette status, or remove and add cassettes during processing of other cassettes. A pass-thru magazine, however, presents additional design challenges including safety, the ability to hold cassettes for transport yet release those cassettes for processing and providing a visual status of processed and non-processed cassettes.

A solution for holding cassettes in a magazine type storage box while providing a means of a quick release of individual cassettes is described in U.S. Pat. No. 4,929,861 by Metcalf. Metcalf teaches the use of a bar having alternating openings and blockages having lock and release positions. The bar can be slid into a release position to make each of the plurality of cassettes releasable by positioning an opening below each lever and then depressing the lever to eject the cassette. Alternately, the bar can be slid into a locking position by situating the bar such that a blockage is below each lever thus preventing depression of the levers and thereby locking each cassette in its storage cell. Metcalf's design is directed towards a box for storing, and possibly locking cassettes therein to prevent theft. This design does not contemplate releasing all cassettes simultaneously for random access by a picker, nor does it provide pass-thru capabilities and import and export positions for cassettes. The storage box is not enabled for interface with an automated storage system.

A cassette magazine that addresses the issue of interfacing the magazine to an automated storage subsystem is described in U.S. Pat. No. 5,247,406 by Apple et al. Apple et al. teach a cassette magazine having cassettes that are freely removable by a picker mechanism by slanting the storage cells such that gravity holds the cartridges in place—a design that prohibits pass-thru storage. Additionally, a locking bar, separate from the magazine is relied upon to lock the cassettes in the magazine. The need for a locking bar is avoided in a design presented in U.S. Pat. No. 5,004,393 by Lunka et al., whereby a spring detent provides pressure sufficient to normally hold a cassette in the magazine yet weak enough for allowing a picker mechanism to remove the cassette therefrom. Releasably holding the cassettes in such a fashion is acceptable for transport since the magazine is not a pass-thru design and the cassettes can reliably rest against the closed end of the storage cells. However, given the weight of the cassettes and sufficient shaking of the magazine, cassettes could fall from the magazine resulting in damage to the cassettes.

An example of a cassette magazine that addresses the issues of providing pass-thru storage for cassettes is taught in U.S. Pat. No. 4,850,485 by Ishikawa. Ishikawa uses two stoppers, one on either side of a cassette, to releasably hold each cassette or lock all cassettes in the magazine. Ishikawa's design is complicated somewhat by the use of dual stoppers. The cassettes are not provided with import and export positions and the magazine is slid down into the storage subsystem such that magazine is held in place by gravity.

What is needed is a pass-thru cassette magazine having a single lock/releasable cassette holding mechanism wherein cassettes can be releasably and/or lockably held in either an import or export position, which lock mechanism interacts with the storage subsystem to interlock the magazine into the storage subsystem while releasably holding cassettes and alternatively to lockably hold such cassettes in either import or export positions when the pass-thru magazine is released from the storage subsystem.

SUMMARY OF THE INVENTION

An object of the present invention is to provide an improved pass-thru cassette magazine for use in an automated cassette loading system.

Another object of the present invention is to provide a pass-thru cassette magazine in an automated storage subsystem wherein the pass-thru cassette magazine locks a plurality of cassettes in the magazine for transport and releasably holds the plurality of cassettes when the pass-thru magazine is locked into the automated storage subsystem.

According to a first embodiment of the present invention, a pass-thru cassette magazine for storing a plurality of cassettes in a plurality of storage cells therein, each cassette having a first retention indentation on an edge thereof, is provided. The pass-thru cassette magazine includes a housing having a bottom, the bottom including a plurality of cantilevers, one cantilever for each storage cell, each cantilever having a cassette retention tab for cooperating with the first retention indentation when a cassette is in a storage cell in an import position. A locking plate is slidably biased below the housing bottom in a magazine non-interlocked position, the locking plate including a corresponding lock bar for each cantilever such that in the magazine non-interlocked position each lock bar maintains each cantilever tab into the first cassette retention indentation thus locking each such cassette in an import position thereat. The locking plate is slidable into a magazine interlock position with the storage subsystem wherein the lock bars are moved to reside below but offset from each corresponding cantilever for releaseably holding each cassette thereat, the locking plate including an interlock feature on a side opposite the plurality of cantilevers. A bottom plate slidably holds the locking plate below the housing and cooperates with the interlock feature for forming an interlock such that if any cassette in a storage cell is not properly aligned in a predetermined position the locking plate is held in the magazine interlock position.

In another embodiment of the present invention, a method for storing, transporting and accessing a plurality of storage mediums for processing in a data storage library having a storage device and a picker mechanism is described. The method includes holding, vertically, the plurality of storage mediums in a pass-thru magazine, such that the plurality of storage mediums are lockably held in an import position. The pass-thru magazine is inserted into the storage library such that the pass-thru magazine interlocks with the storage library and the plurality of storage mediums are caused to be releasably held in the pass-thru magazine accessible to the picker mechanism. The picker mechanism picks each storage medium for processing each storage medium and replaces each processed storage medium in the pass-thru magazine in an export position. The pass-thru magazine is removed from the storage medium by releasing the magazine interlock while simultaneously locking the plurality of storage mediums in the pass-thru magazine.

The foregoing and other objects, features, and advantages of the invention will be apparent from the following more particular description of a preferred embodiment of the invention, as illustrated in the accompanying drawing.

DETAILED DESCRIPTION OF THE INVENTION

Referring now to the illustrations, like numerals correspond to like parts depicted in the figures. The invention will be described as embodied in an automated magnetic tape storage subsystem for use in a data processing environment. Although the invention is shown using magnetic tape cartridges, one skilled in the art will recognize that the invention equally applies to optical disk cartridges or other removable storage media. Furthermore, the description of an automated magnetic tape storage system is not meant to limit the invention to data storage applications as the invention described herein can be applied to magazine storage and cassette handling systems in general.

Figure 1:
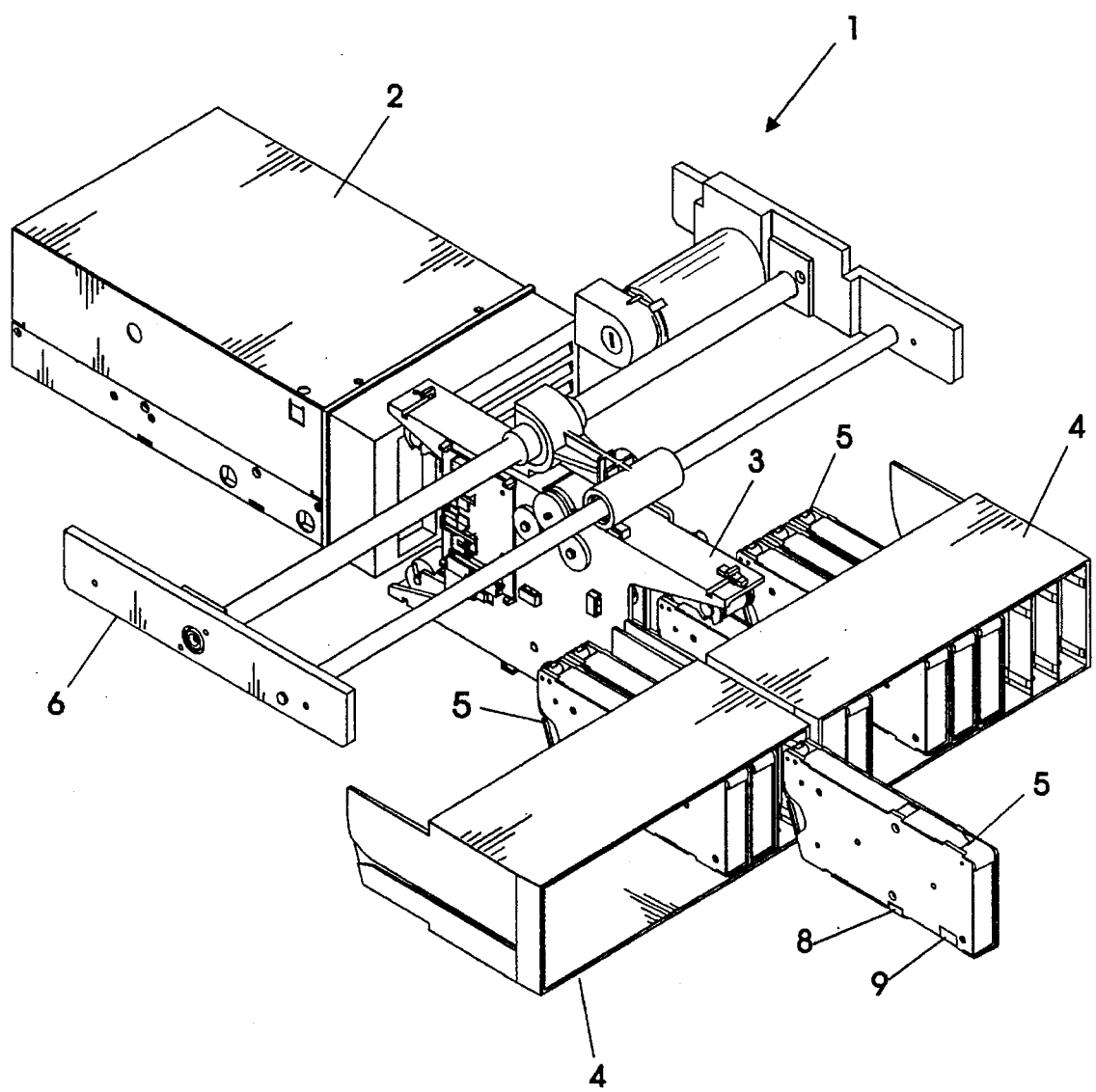
FIG. 1 is a pictorial diagram of an automated storage system having magazines containing removable media, a storage device, and a picker assembly with two tandem, independent grippers.

FIG. 1 shows an automated cassette loader (ACL) or automated storage subsystem 1 for managing removable media, for example magnetic tape. The removable media is contained within a plurality of data cassettes 5, wherein the data cassettes 5 typically house magnetic tape reel(s) or optical discs, etc. Each data cassette 5 is located within a passthru cassette magazine 4 (hereinafter referred to simply as magazine 4). A pass-thru cassette magazine is a magazine that allows a cassette to enter at one location and be retrieved from another location, that is, a cassette may "pass-through". Each magazine 4 includes a plurality of storage cells separated from one another by dividers for holding the plurality of data cassettes 5 in a vertical orientation. The magazine 4 provides a means of retaining each data cassette 5 while alternatively releasably holding each data cassette 5 thus allowing access to retrieve the plurality of data cassettes 5 via a picker assembly 3. Each data cassette 5 includes dual cassette indentation retention features 8 and 9 associated with lockably holding each data cassette 5 in an export or import position, respectively.

The automated storage subsystem 1 also includes at least one storage device 2, for example an IBM 3490 Magnetic Tape Drive. The magazine 4 is located across from and parallel to the storage device 2. The magazine may also be situated parallel and adjacent to the storage device 2 (not shown). The picker assembly 3 transports a data cassette 5 from an import position within the magazine 4 to a loader slot in the storage device 2. An import position is defined as a data cassette position substantially within the magazine 4 such that the data cassette can be lockably or releasably held by the magazine 4 and grabbable by the picker assembly 3. The picker assembly 3 is attached to an accessor 6 that translates the picker assembly 3 parallel to the storage device 2 and magazine 4. This translation allows the picker assembly 3 to be positioned directly in line with any of the plurality of data cassettes 5 and/or the loader slot.

Upon being positioned in line with a selected data cassette 5, the picker assembly 3 retrieves the data cassette 5 from the magazine 4. The data cassette 5 is retained within the picker assembly 3 while the picker assembly 3 is translated to the storage device 2 via the accessor 6. At the storage device 2, the picker assembly 3 transfers the data cassette 5 into the storage device 2. After the storage device 2 has processed the data cassette 5, the picker assembly 3 removes the data cassette 5 from the storage device 2 and is translated back to the originating storage cell (or an empty storage cell) within the magazine 4, where the picker assembly 3 transfers the data cassette 5 back into the magazine 4 in an import or an export position. An export position is defined as a position wherein a data cassette can be lockably or releasably held by the magazine 4 and out of reach of the picker assembly 3 while providing a visual indication to an operator that the data cassette has been processed.

The magazine 4 performs several functions beyond simply holding data cassettes 5 in a position randomly accessible to the picker assembly 3. Each magazine 4 is designed to lock the data cassettes 5 within corresponding storage cells in either the import or export position when the magazine 4 is not interfaced to the storage subsystem 1 (that is, during handling by an operator). The "cassette locked" position indicates that a data cassette 5 cannot be removed from the magazine 4 without substantial force, for example, one kilogram of force or more. Conversely, a data cassette 5 held in the "cassette unlocked" position can typically be removed from its storage cell with less than 300 grams of force. When a magazine 4 is interfaced to the storage subsystem 1, the magazine 4 is interlocked thereto such that the magazine 4 cannot be removed without releasing the magazine interlock. While the magazine 4 is interlocked, the cassette lock on the data cassettes 5 is disabled so that the data cassettes 5 can be freely picked by the picker assembly 3 or removed or inserted by an operator.

Data cassettes 5 would normally reside in one of two predetermined positions, that is, in the import or export position. If a data cassette 5 is in a position other than import or export, a potential problem exists and the interlock mechanism release is disabled thus requiring all data cassettes 5 to be properly positioned before the magazine 4 can be removed from the storage subsystem 1. If the magazine 4 were allowed to be removed with a data cassette 5 improperly positioned, that data cassette and others would not be safely locked for transport.

Figure 2:
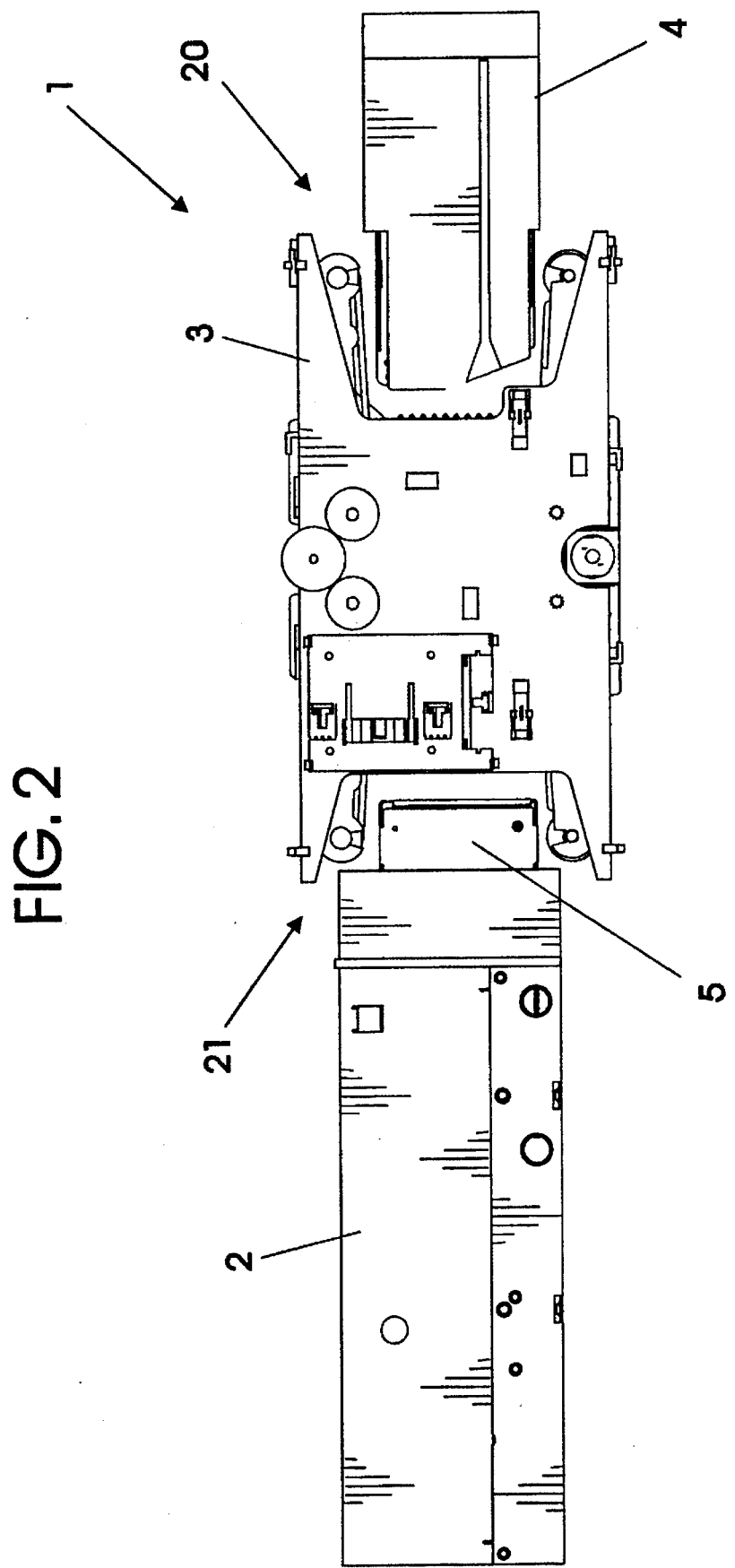
FIG. 2 is a side view of the automated storage device illustrating a picker assembly utilizing a fore and aft gripper.

Referring now to FIG. 2, a tandem relationship of fore and aft grippers 20 and 21, respectively, of the picker assembly 3 is shown. The fore gripper 20 faces the magazine 4, and the aft gripper 21 faces the storage device 2. The tandem relationship of the fore gripper 20 to the aft gripper 21 enables a data cassette to "pass-thru" the picker assembly 3, hence the picker assembly 3 operates a pass-thru picker. Both the fore and aft grippers 20, 21 extend beyond an envelope of the data cassettes 5 when a data cassette 5 is present on either side of the picker assembly 3. For the picker assembly to be translated, the fore and aft grippers 20, 21 must be in an open position (as shown) to avoid an interference with any residing data cassettes 5. Note that by operating the fore and aft grippers 20, 21 independently, a distance separating the magazine 4 from the storage device 2 can be minimized since the fore gripper 20 can be held open except when grabbing a data cassette 5. Additionally, there is no need to translate the picker assembly perpendicular to the storage device 2 and the magazine 4.

In order to retrieve a data cassette 5 from the magazine 4 or the storage device 2, the appropriate fore or aft gripper 20, 21 must close and contact the given data cartridge. The picker assembly 3 described herein allows for the fore and aft grippers 20, 21 to operate independently, i.e., the fore gripper 20 can be maintained in an open position while the aft gripper 21 is actuated open or closed, or vice versa. A benefit realized by independent gripper operation is that a given data cassette can be retrieved or returned by the picker assembly 3 without disturbing other data cassettes 5. Inspection of the relationship between the fore gripper 20 and the magazine 4 (and a data cassette 5 which is hidden by the magazine 4) reveals that a data cassette 5 in an import position places the cassette 5 within upper and lower fingers of the fore gripper 20. Conversely, the fore gripper 20 can eject the cassette 5 back into the magazine 4 into an export or processed position wherein only a top portion of the cassette 5 is within the fingers of the fore gripper 20 and hence the picker mechanism could not re-grip the processed data cassette 5.

Figure 3:
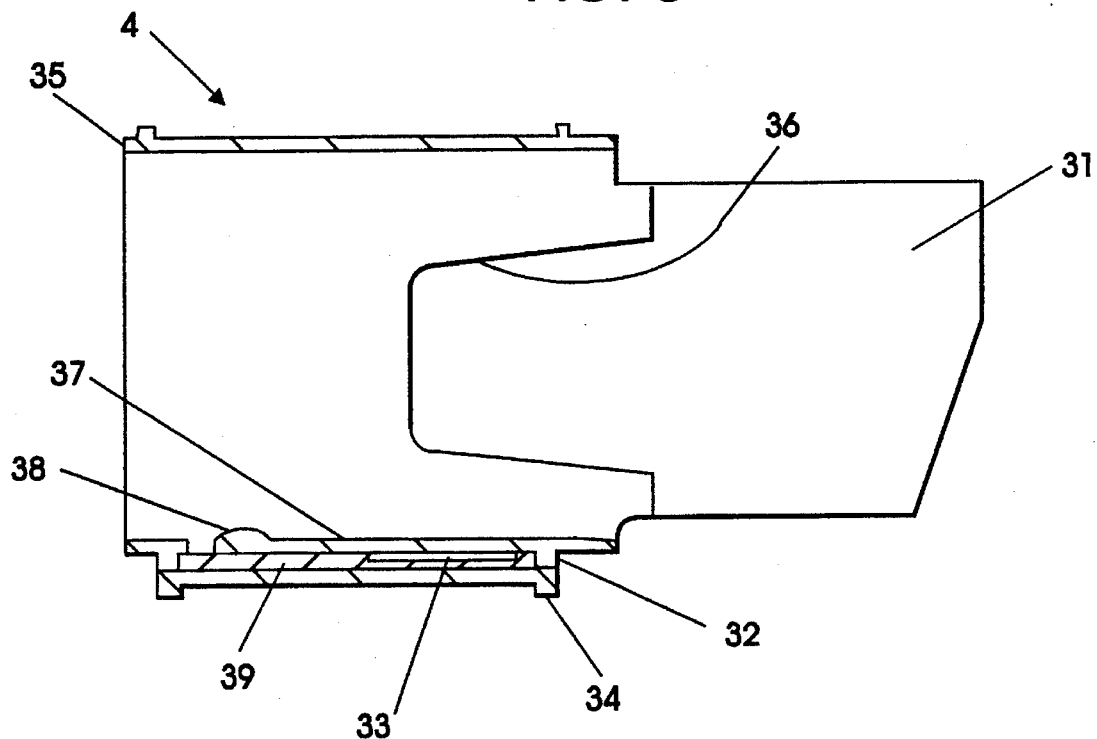
FIG. 3 is a perspective view of a side of a pass-thru cassette magazine having a portion cut-away for showing a lock plate in a cassette locked position.

Referring now to FIG. 3, a cut-away side view of the magazine 4 is shown. A side 31 of the magazine 4 extends beyond a main body of the magazine 4 having a length approximating the length of a data cassette 5 and providing guidance features (not shown) for guiding the magazine 4 into the storage subsystem 1. A divider 36 is shown which provides a partial wall separating one storage cell from another and extending between a top 35 and a bottom 32 of the magazine 4. The bottom 32 includes a plurality of cantilevers 37, one for each storage cell. Each cantilever 37 further includes a tab or cassette retention feature 38 (hereinafter referred to as tab 38) which mates or cooperates with one of the two retention indentations 8, 9 (import and export indentations) with each data cassette 5.

The cantilever 37 as shown in FIG. 3 is in a "cassette locked" position, that is, the tab 38 mates with a cassette retention indentation 9 (FIG. 1) to lockably hold the data cassette 5 in the storage cell. The cantilever 37, and hence the tab 38, is held in place, which is upward into a data cassette 5 retention indentation, by a lock plate 33 which has a plurality of lock bars 39, one lock bar 39 for each cantilever 37. The lock plate 33 is slidable into one of two predetermined positions, a magazine interlocked and a magazine non-interlocked position, wherein in the magazine non-interlocked position the lock plate 33 not only locks the data cassettes 5 into respective storage cells, but the lock plate 33 also interfaces with a bottom plate 34 such that the magazine 4 can be inserted to or removed from the storage subsystem 1 (magazine non-interlocked position). The bottom plate 34 functionally holds the lock plate 33 slidably, and with a spring bias, below bottom 32.

The term "magazine non-interlocked" may be used interchangeably with the term "cassette locked" as these terms refer to a like position of the lock plate 33, but wherein the former term is more descriptive of a relationship between the magazine 4 and the storage subsystem 1 and the latter term is more descriptive of a relationship between the magazine 4 and the data cassettes 5. Similarly, term "magazine interlocked" may be used interchangeably with the term "cassette unlocked" as these terms also refer to a like but different position of the lock plate 33, and again wherein the former term is more descriptive of a relationship between the magazine 4 and the storage subsystem 1 and the latter term is more descriptive of a relationship between the magazine 4 and the data cassettes 5.

Figure 4:
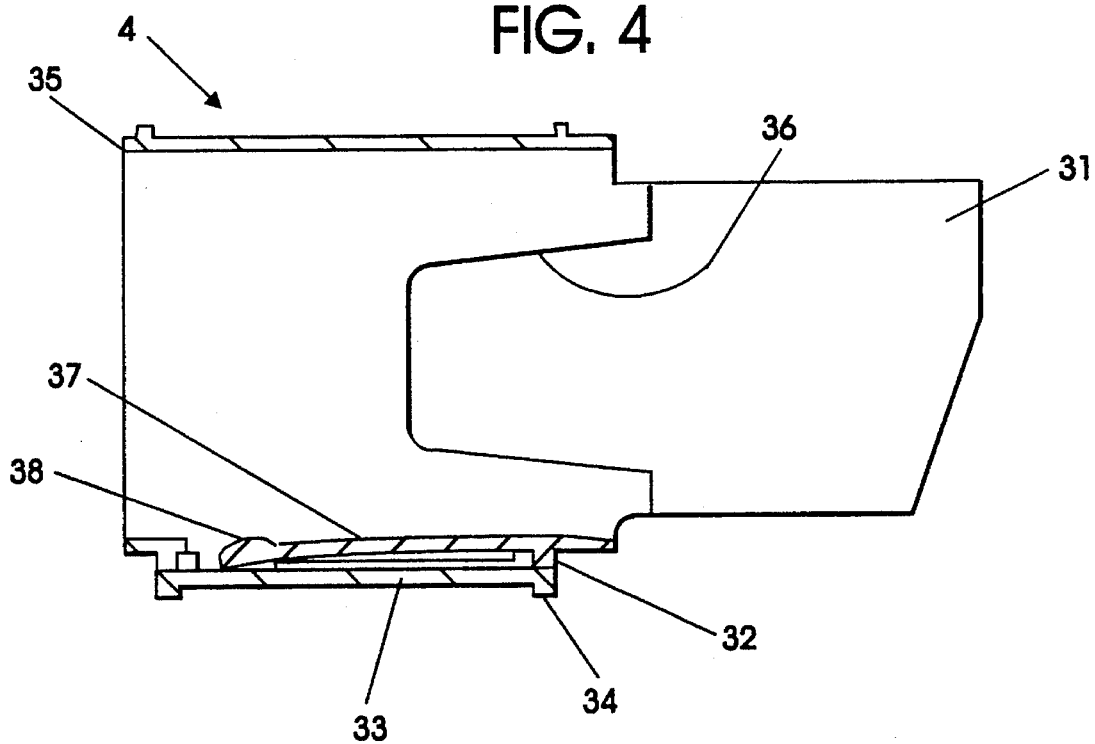
FIG. 4 is a perspective view of the pass-thru cassette magazine having a portion cut-away for showing the lock plate in a cassette release position.
Figure 5:
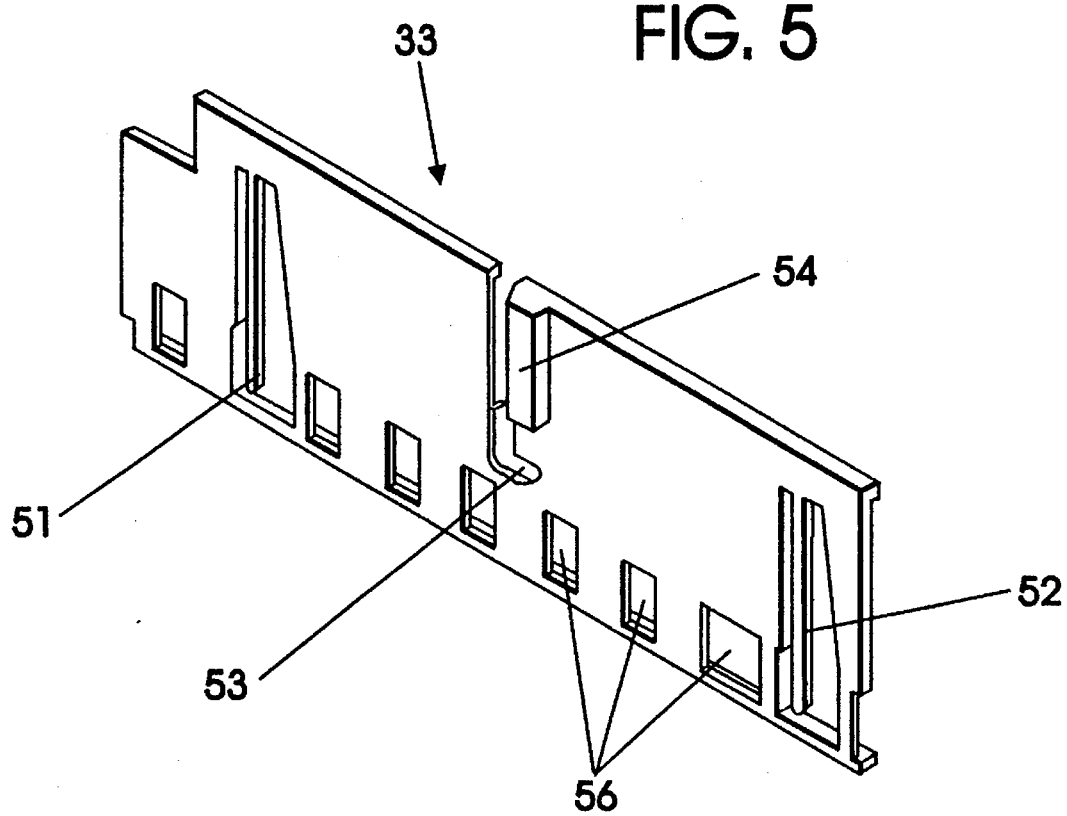
FIG. 5 is a perspective view of a bottom side of the lock plate of the pass-thru cassette magazine.
Figure 6:
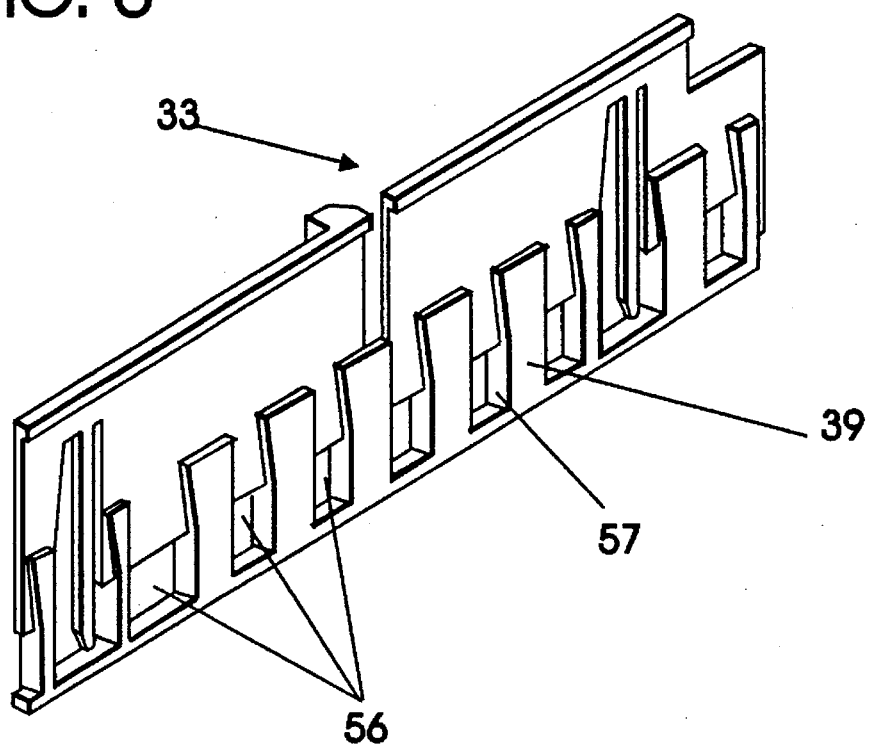
FIG. 6 is a perspective view of a top side of the lock plate of the pass-thru cassette magazine.

FIG. 4 depicts a like cut-away side view of the magazine 4 but with the lock plate 33 slid into the cassette unlocked or magazine interlocked position. In the cassette unlocked position, the lock plate is aligned such that each lock bar 39 (not shown due to cut away) is located not directly below but below and to a side of each corresponding cantilever 37, and instead an opening or void is located substantially below each tab 38. Thus, each tab 38, via the cantilever 37 and pressure from a data cassette 5, is easily pushed downward into the void such that each data cassette 5 can be easily removed from the magazine 4. Hence, in the cassette unlocked position, the data cassettes 5 are releasably held in the magazine 4. Additionally, in the interlocked position, the locking plate 33 and the bottom 34 cooperate to form an "interlock" for securing the magazine 4 to the storage subsystem 1. FIGS. 5 and 6, show a bottom and top side, respectively, of the locking plate 33 in greater detail. In FIG. 5, two spring members 51 and 52, which are molded as part of the lock plate 33, are located for springably biasing the lock plate 33 relative to the cantilevers 37 (FIG. 3), for example, in the magazine non-interlocked position. A manual lock tab 54 is provided for allowing an operator a method to manually slide the lock plate 33 against the spring bias and into the cassette unlocked position. Under conditions of frequent use, the molded spring members 51, 52 may fail or break prematurely. Alternately, metal springs can be used instead of the molded spring members 51, 52 that attach to the bottom plate and push against the lock plate 33 for providing the desired spring bias. FIG. 5 additionally shows the plurality of openings or voids 56 which allow the cantilevers 37 to recede away from the data cassettes 5 for easy insertion or removal. A groove 53 is provided which cooperates with the bottom 34 (FIG. 3) for forming an interlock feature to interlock the magazine 4 to the storage subsystem 1.

Referring again to FIG. 6, the top side of the lock plate 33 shows the relationship of the openings 56 to the lock bars 39.

Each lock bar 39 is provided with a safety ramp 57 which slopes inward from bottom to top towards the lock bar 39. In the event that a cantilever 37 (FIG. 3) fails resulting in breakage, when the lock bar is attempted to be slid into the cassette locked position (removing the magazine 4 from the storage subsystem 1, for example), the safety ramp 57 will guide the failed cantilever 37 up into the corresponding data cassette 5 retention indentation thus allowing the lock bar 33 to be slid into its desired position.

Figure 7:
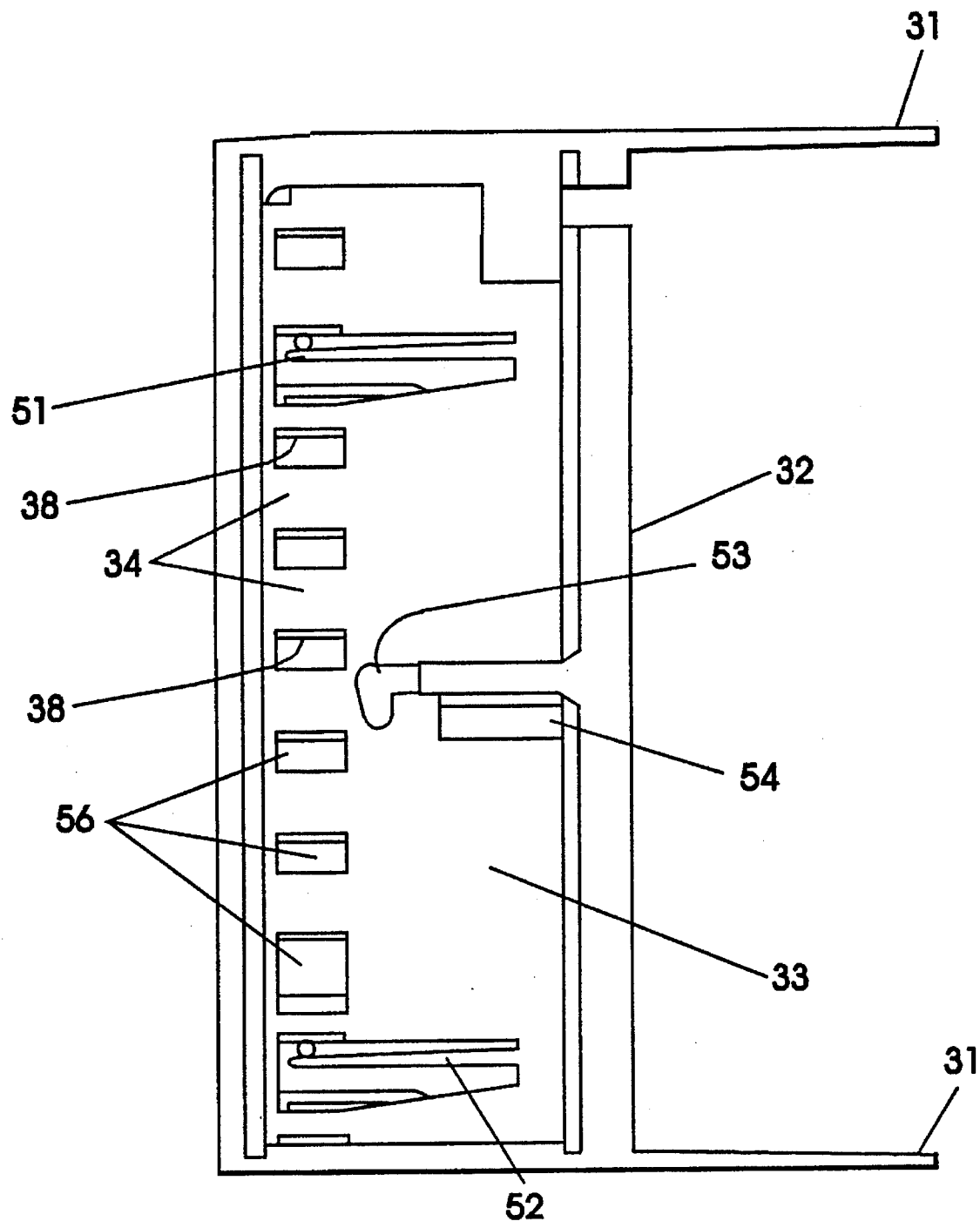
FIG. 7 is a bottom view of the pass-thru cassette magazine having a bottom removed for showing a relationship between the lock plate and the cantilevers when the lock plate is in the cassette locked position.

FIG. 7 is a bottom view of the magazine 4 having the bottom plate 34 removed therefrom for exposing the lock plate 33. The lock plate 33 is shown in the spring biased cassette locked position. In the cassette locked position the tabs 38 are supported above corresponding lock bars 34 and are thus only partially visible. Additionally, the spring members 51 and 52 are applying a bias pressure against the bottom 32 for holding the lock plate 33 in position. Manual lock tab 54 can be grasped for sliding the lock plate 33 into the cassette unlocked position for releasing data cassettes 5. The groove 53 is moved with the manual lock tab 54 which creates and/or releases the interlock with the storage subsystem 1 as will become apparent.

Figure 8:
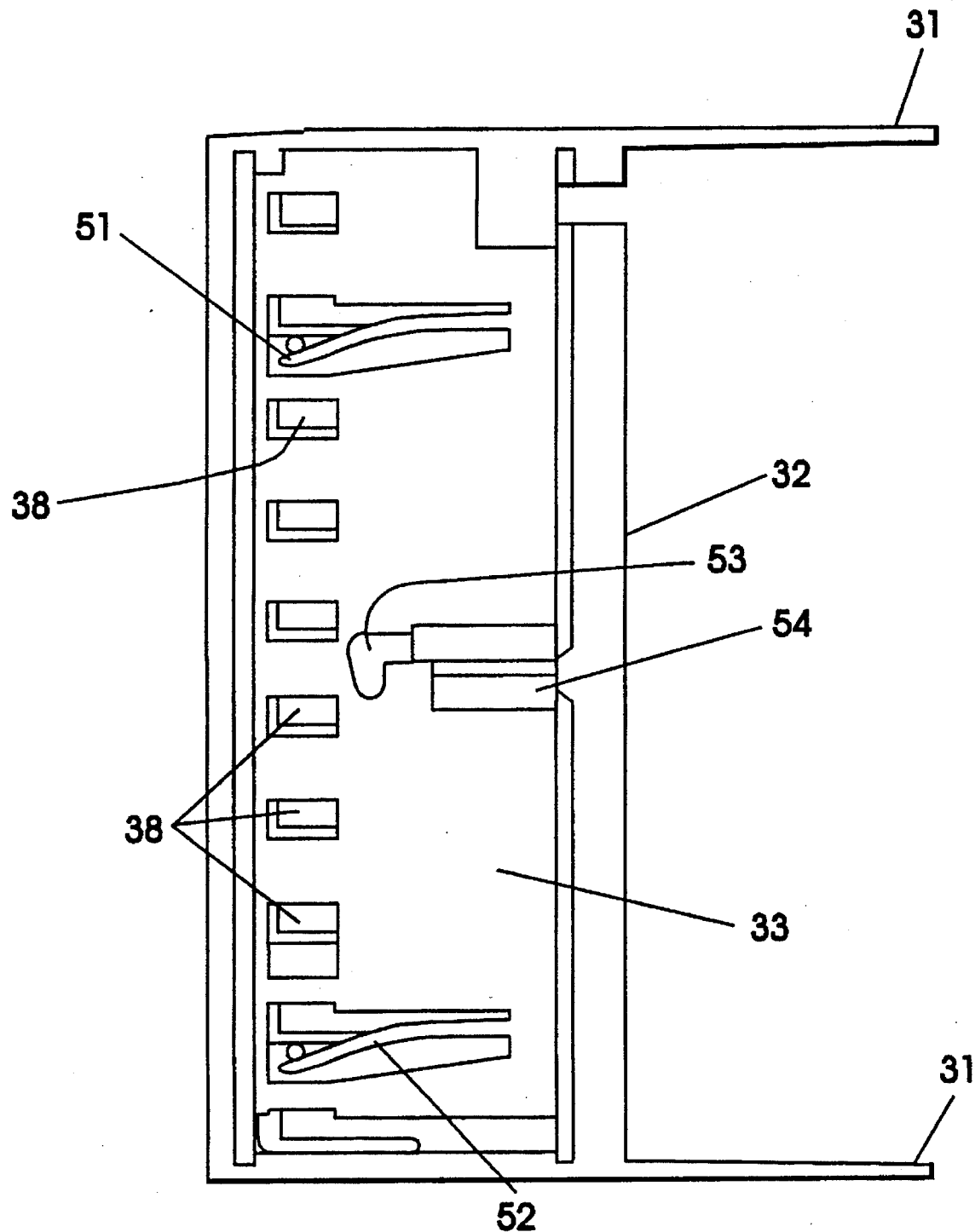
FIG. 8 is a bottom view of the pass-thru cassette magazine having a bottom removed for showing a relationship between the lock plate and the cantilevers when the lock plate is in a cassette released position.

FIG. 8 is a bottom view of the magazine 4 also having the bottom plate 34 removed for exposing the lock plate 33, but in this instance with the lock plate 33 in the cassette unlocked position. Here, a bottom side of tabs 38 can be seen through openings 56 wherein the tabs 38 are free to move down into openings 56 to allow data cassettes to easily slide over the tabs 38. The spring members 51 and 52 have an external force applied thereto either by the manual lock tab 54 or by an interface at the storage subsystem 1. The groove 53 is in the interlocked position but the interlock itself is formed in combination with the removed bottom 34.

Figure 9:
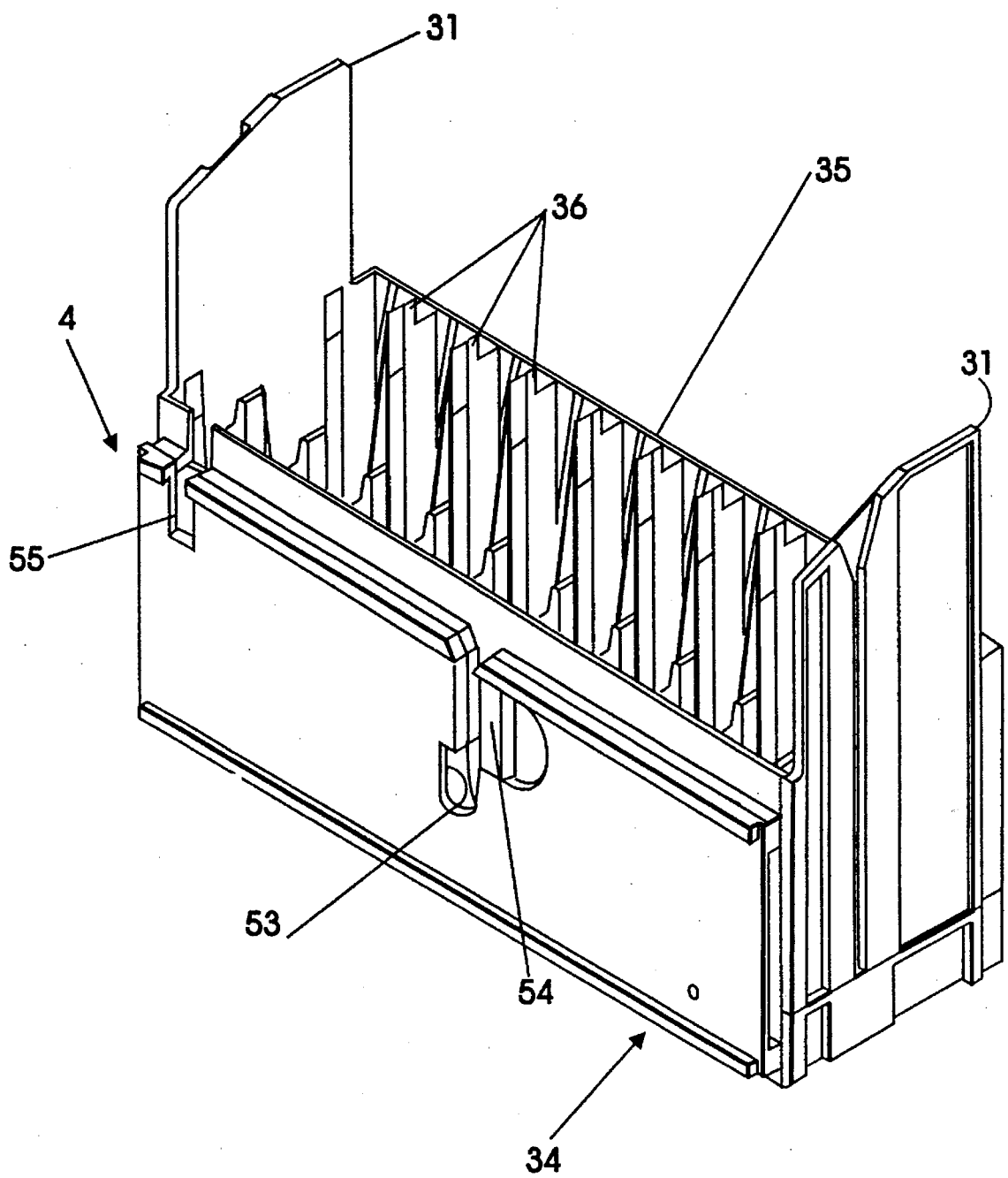
FIG. 9 is a perspective view of the pass-thru cassette magazine having all data cassettes removed therefrom and depicting an interlock feature in a magazine non-interlocked position.

FIG. 9 provides a perspective view of the magazine 4 from a bottom orientation. The groove 53 and manual lock tab 54 interface with bottom 34 for forming the interlock. The lock plate 33 is shown in the magazine non-interlocked position wherein an open path is formed from the groove 53 to an edge of the bottom 34 such that a pin (not shown), for example, of the storage subsystem 1 can slide therethrough. The actual interlock is formed by closing off the open path. A relationship of the plurality of dividers 36 can be more clearly seen for forming the plurality of storage cells. Guide features can also be seen on edge 31 for assisting guidance of the magazine 4 into and out of the storage subsystem 1. A cassette present sensor slot 55 is provided so that storage subsystem 1 is able to sense a manual insertion of a cassette 5 into a priority storage slot for priority processing. This present sensor slot 55 can alternately be located on a side 31 without departing from the present sensing function. While the storage cells are substantially shorter in length than a length of the data cassette 5, the edges 31 are substantially the same length thereby offering protection to data cassettes 5 stored in end storage cells. Additionally, edges 31 provide sensor obstructions for positioning the picker assembly 3.

Figure 10:
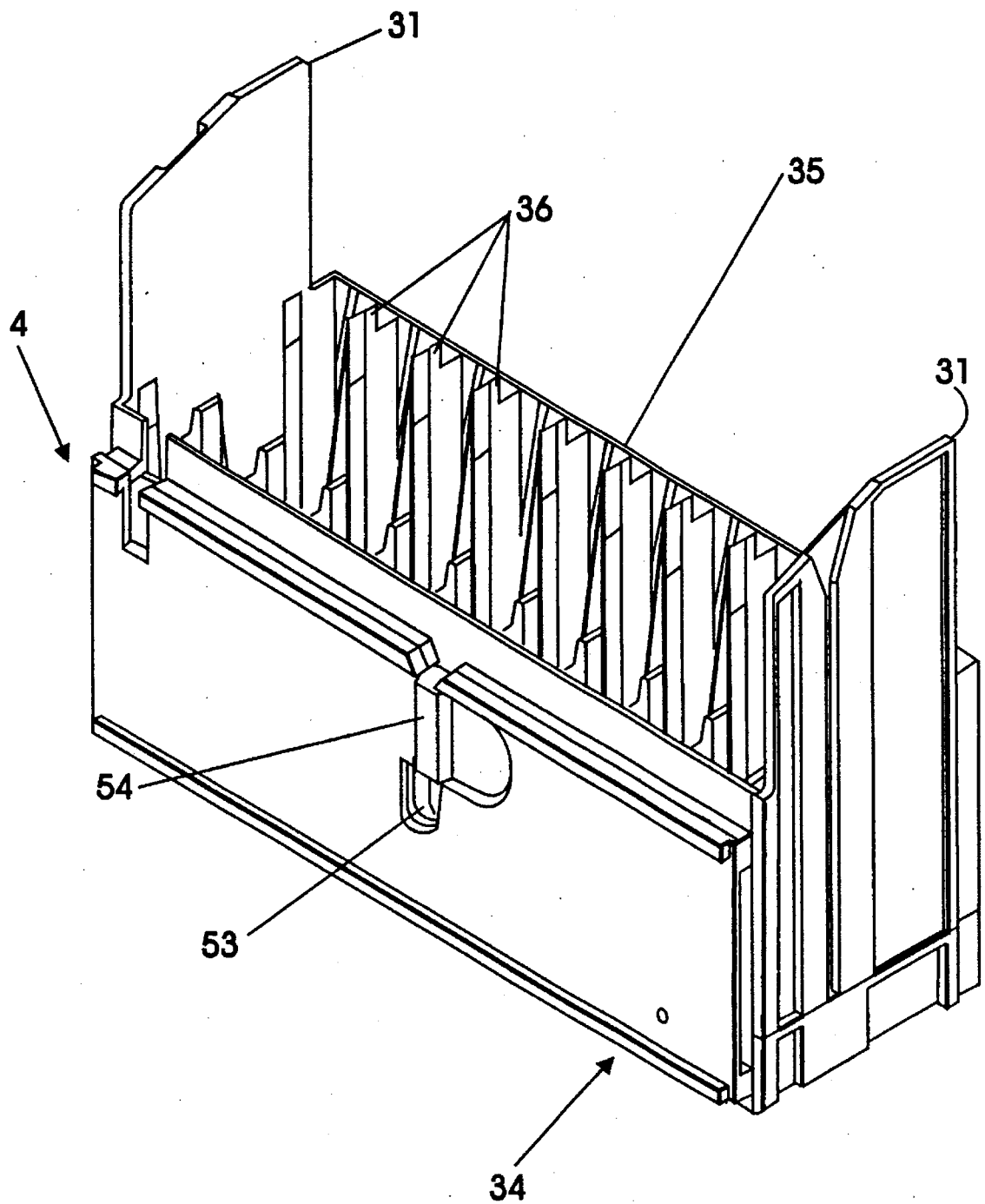
FIG. 10 is a perspective view of the pass-thru cassette magazine having all data cassettes removed therefrom and depicting the interlock feature in the magazine interlocked position.

FIG. 10 provides a perspective view of the magazine 4 from a bottom orientation wherein the groove 53 and manual lock tab 54 are slid into the magazine interlocked position. The manual lock tab 54 now blocks the open path such that a pin held in groove 53 is interlocked with the bottom plate 54 and the magazine 4 is prevented from being removed from the storage subsystem 1. Having slid the lock plate 33 into the magazine interlocked position unlocks the data cassettes 5 as previously described.

METHOD OF OPERATION

Referring again to FIG. 1, the function of the picker assembly 3 is to transfer a data cassette 5 from the magazine 4 to the storage device 2, and subsequently return the data cassette 5 to the originating storage cell within the magazine 4. The magazine 4 can be loaded with data cassettes 5 by an operator by sliding the manual lock tab 54 into the cassette unlock position. Typically, less than 300 grams of force is required to overcome the spring bias force applied by the spring members 51, 52. Having loaded the magazine 4, the manual lock tab 54 is released thus locking the cassettes 4 into the storage cells of the magazine 4. The magazine 4 can now be inserted into the storage subsystem 1. Inserting the magazine 4 causes the groove 53 and bottom plate 34 to interact with the storage subsystem 1 such that the lock plate 34 is again pushed into the magazine interlocked position so that the magazine 4 is locked in place and the data cassettes 4 are now releasably held in the storage cells.

Figure 11:
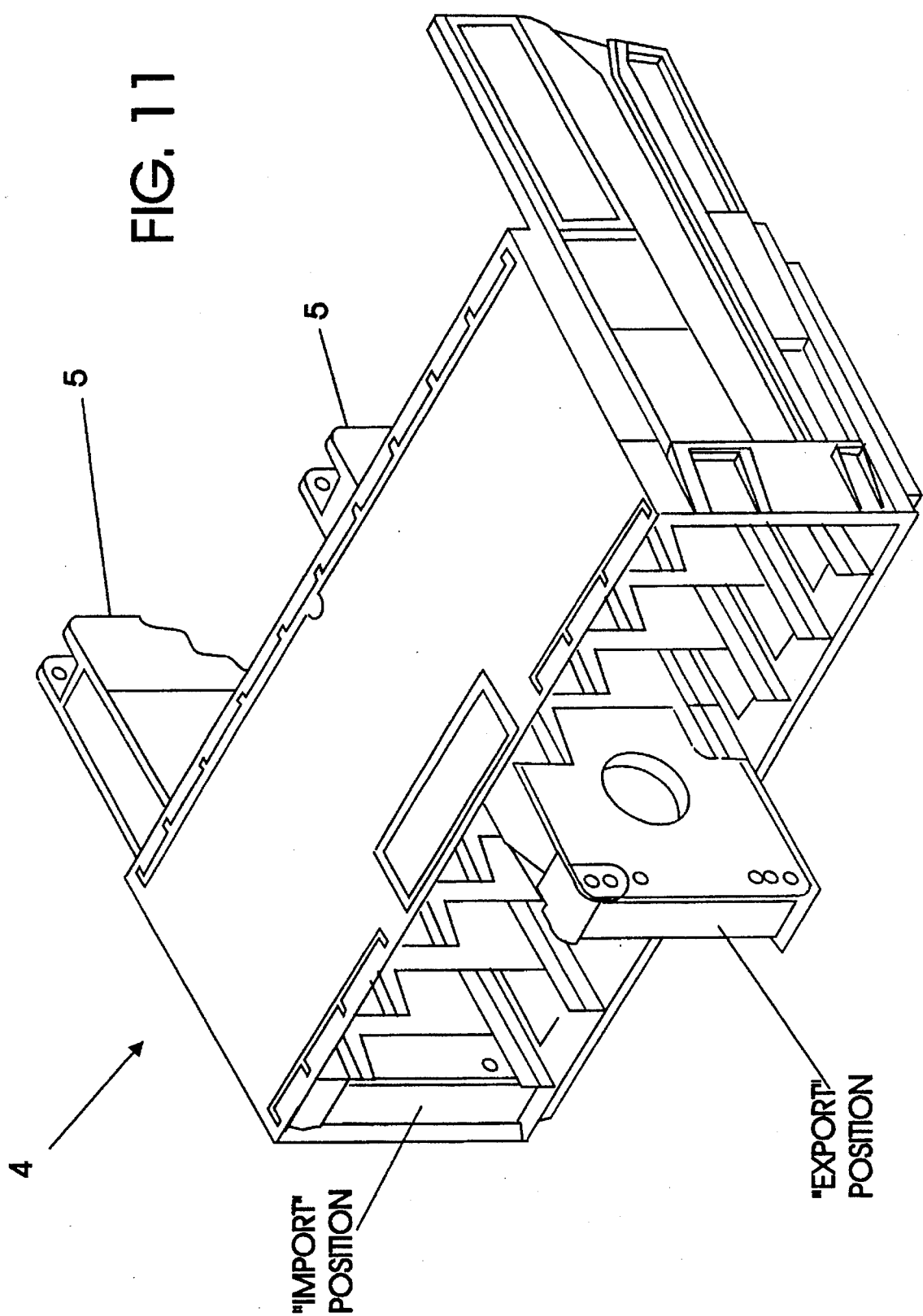
FIG. 11 is a perspective view of the pass-thru cassette magazine showing data cassettes in both the import and export positions.

The operation sequence begins when a request is sent to the automated storage subsystem 1 to load into the storage device 2 a specific data cassette 5 located within the magazine 4. The initial state of the picker is with the fore gripper 20 and the aft gripper 21 both in the open position, allowing the picker assembly to freely traverse the magazine 4. The accessor 6 will translate the picker assembly to be in line with the storage cell known to contain the requested data cassette 5. The requested data cassette, which is releasably held in the magazine 4 in an import position (reachable by the fore gripper 20) can be gripped and removed from the magazine 4 and loaded into the loader slot 2 for processing. After processing is complete, the aft gripper 21 removes the data cassette 5 from the storage slot. The processed data cassette 5 is returned to its original storage cell or to an empty storage cell by the fore gripper 20. The processed data cassette 5 is ejected by the fore gripper 20 back into the storage cell such that the processed data cassette 5, for example, is now in an export position, that is, the cassette export retention indentation 8 is aligned above the tab 38. In the preferred embodiment of the present invention, a data cassette 5 in an export position is out of reach of the fore gripper 20. FIG. 11 depicts a cassette 5 loaded in both an import and an export position. The fore gripper 20 is able to push the data cassette 5 out of its own reach since a top edge of the data cassette 5 is longer than a bottom edge and the top finger of the fore gripper is able to push the data cassette 5 away by the top edge thereof.

Processed data cassettes 5 are visible to the operator by virtue of being returned to the export position. At the appropriate time, the operator can disable the interlock between the storage subsystem 1 and the magazine 4 to remove the magazine 4 therefrom for retrieving the processed data cartridges. At this time the processed data cassettes 5 are locked into the export positions. If a system error occurs and a data cassette 5 is in a position in the magazine 4 other than an import or export position, the tab 38 will block a corresponding lock bar 39 such that the lock plate 33 will be prevented from sliding back into the magazine non-interlocked position thus preventing magazine removal until the error is corrected.

In summary, an automated storage subsystem for randomly selecting one cassette from a plurality of cassettes held in a pass-thru cassette magazine and transporting the selected cassette therefrom to a storage device has been described. The automated storage subsystem includes the storage device for receiving the selected cassette for retrieving data therefrom and/or storing data thereto. Each cassette has first and second retention features spaced apart and aligned on an edge thereof. The pass-thru cassette magazine is retained in the automated storage subsystem in a magazine interlocked position while the plurality of cassettes are maintained in the pass-thru cassette magazine in a cassette unlocked state for removal therefrom and return thereto by the picker mechanism. The pass-thru cassette magazine maintains the plurality of cassettes in a cassette locked state when the pass-thru cassette magazine is released from said automated storage subsystem. The pass-thru cassette magazine includes a housing having first and second sides, a top and a bottom, and a plurality of dividers substantially equally spaced apart between the first and second sides for defining a plurality of storage cells. The housing is open at a front and a back for allowing each cassette to pass through each storage cell, wherein the storage cells are substantially shorter in length than a length of the cassettes. The bottom of the housing has a plurality of cantilevers, each cantilever having a cassette retention feature thereon, and wherein each cantilever is positioned at a storage cell location for mating either the first or second cassette retention feature therewith for retaining the corresponding cassette in either the import or export position thereat. A locking plate includes upper and lower surfaces and a plurality of locking bars are formed on the upper surface and an interlock feature is formed on the bottom surface. The locking plate is slidably held below the housing bottom such that the locking plate is slid into a magazine interlocked position when the pass-thru cassette magazine is loaded into the automated storage subsystem causing each lock bar of the plurality of lock bars to be below and offset from a corresponding cantilever of the plurality of cantilevers, thus releasably holding the plurality of cassettes. The locking plate is slid into a magazine non-interlocked position when the pass-thru cassette magazine is removed from said automated storage subsystem such that each lock bar is substantially aligned beneath a corresponding cantilever for locking the cassettes in said storage cells. A housing plate attached to the bottom slidably holds the locking plate between the bottom and the housing plate.

While the invention has been particularly shown and described with reference to preferred embodiments thereof, it will be understood by those skilled in the art that various changes in form and details may be made therein without departing from the spirit and scope of the invention. For example, various changes may be made to certain materials as long as the critical requirements are met, for example, weight, strength, etc. Still further, means for attaching structures together may be changed without departing from the scope of the invention.

What is claimed is:

1. A pass-thru cassette magazine adapted for holding a plurality of cassettes for use in an automatic cassette loader (ACL) system, each cassette having a first retention feature on an edge thereof, said pass-thru cassette magazine retained in said ACL in a magazine interlocked state while said plurality of cassettes are maintained in said pass-thru cassette magazine in a released state for removal therefrom and return thereto by a picker mechanism, said pass-thru cassette magazine maintaining said plurality of cassettes in a locked state when said pass-thru cassette magazine is released from said ACL, said pass-thru cassette magazine comprising:

a housing having first and second sides, a top and a bottom, and a plurality of dividers substantially equally spaced apart between said first and second sides for defining a plurality of storage cells, said housing further being open at a front and a back for allowing each cassette to pass through each storage cell, said bottom having a plurality of cantilevers, each cantilever having a cassette retention feature thereon, wherein each cantilever is positioned at a storage cell location for mating the corresponding cassette retention feature with the first retention feature of a corresponding cassette for retaining the corresponding cassette in a first position thereat;

a locking plate having upper and lower surfaces and a plurality of locking bars formed on said upper surface and an interlock feature on said bottom surface, said locking plate slidably held below said housing bottom such that said locking plate is slid into the magazine interlocked state when said pass-thru cassette magazine is loaded into said ACL causing each locking bar of said plurality of locking bars to be offset from a corresponding cantilever of said plurality of cantilevers, thus releasably holding said plurality of cassettes, and said locking plate being slid into a non-interlocked position when said pass-thru cassette magazine is removed from said ACL such that each locking bar is substantially aligned beneath a corresponding cantilever for locking said cassettes in said storage cells, and further wherein each locking bar includes a safety ramp for forcing a failed cantilever into the corresponding storage cell area to ensure that said locking bar can be forced into the non-interlocked position; and a housing plate attached to said bottom for slidably holding said locking plate between said bottom and said housing plate.

2. The pass-thru cassette magazine according to claim 1 further comprising a spring for maintaining said locking plate in a biased non-interlocked position such that the default position of said locking plate locks said cassettes in said storage cells.

3. The pass-thru cassette magazine according to claim 2 wherein said locking plate further comprises a manual tab on the bottom side for providing a manual override for releasing said cassettes.

4. The pass-thru cassette magazine according to claim 3 wherein the cassettes are held in a vertical position.

5. The pass-thru cassette magazine according to claim 4 wherein ten storage cells are provided.

6. The pass-thru cassette magazine according to claim 5 wherein each cassette includes a second retention feature spaced apart from and aligned with the first retention feature on the edge thereof such that when the first retention feature is aligned with the corresponding cantilever the cassette is fully inserted into said passthru cassette magazine in the first position, and when the second retention feature is aligned with said corresponding cantilever the cassette is in a second position.

7. The pass-thru cassette magazine according to claim 6 wherein the locking plate is releasable from the interlocked position only if said each cassette is in the first or second position.

8. The pass-thru cassette magazine according to claim 7 wherein the first position is an import position and the second position is an export position.

9. The pass-thru cassette magazine according to claim 7 wherein each cassette houses magnetic tape.

10. A pass-thru cassette magazine for storing a plurality of cassettes in a plurality of storage cells therein, each cassette having a first retention indentation on an edge thereof, Said magazine comprising:

a housing having a bottom including a cantilever for each storage cell, said each cantilever having a cassette retention tab for cooperating with said first retention indentation when a cassette is in an import position;

a locking plate slidably biased below said housing bottom in a magazine non-interlocked state having a corresponding lock bar for each cantilever such that in the magazine non-interlocked state each lock bar forces each cantilever tab into the first cassette retention indentation thus locking each such cassette in an import position thereat, said locking plate slidable into a magazine interlock state wherein each lock bar is moved to a side of each corresponding cantilever for releasably holding each cassette thereat, said locking plate including an interlock feature opposite said cantilevers, and wherein each lock bar includes a safety ramp for forcing a failed cantilever into the corresponding storage cell area to ensure that said lock bar can be forced into the non-interlocked position; and a bottom plate for slidably holding said locking plate below said housing and cooperating with said interlock feature for forming an interlock such that if any cassette in a storage cell is not aligned in a predetermined position the locking plate is forcibly held in the interlock position.

11. The pass-thru cassette magazine according to claim 10 wherein each cassette further includes a second retention indentation aligned with and spaced apart from said first retention indentation such that each said corresponding cantilever tab cooperates to lock each said cassette in an export position when said locking plate is biased in said magazine non-interlock state.

12. The pass-thru cassette magazine according to claim 11 wherein said locking plate further comprises a manual tab for manually pushing said locking plate into the magazine interlock state for removing said cassettes therefrom.

13. The pass-thru cassette magazine according to claim 12 further comprising a bias means for springably biasing said locking plate in said magazine non-interlock state.

14. The pass-thru cassette magazine according to claim 13 wherein said cassettes are held in said storage cells in a vertical position with each said cantilever below each corresponding cassette.

15. The pass-thru cassette magazine according to claim 14 wherein said pass-thru cassette magazine includes 10 storage cells.

* * * * *